Patented Aug. 26, 1941

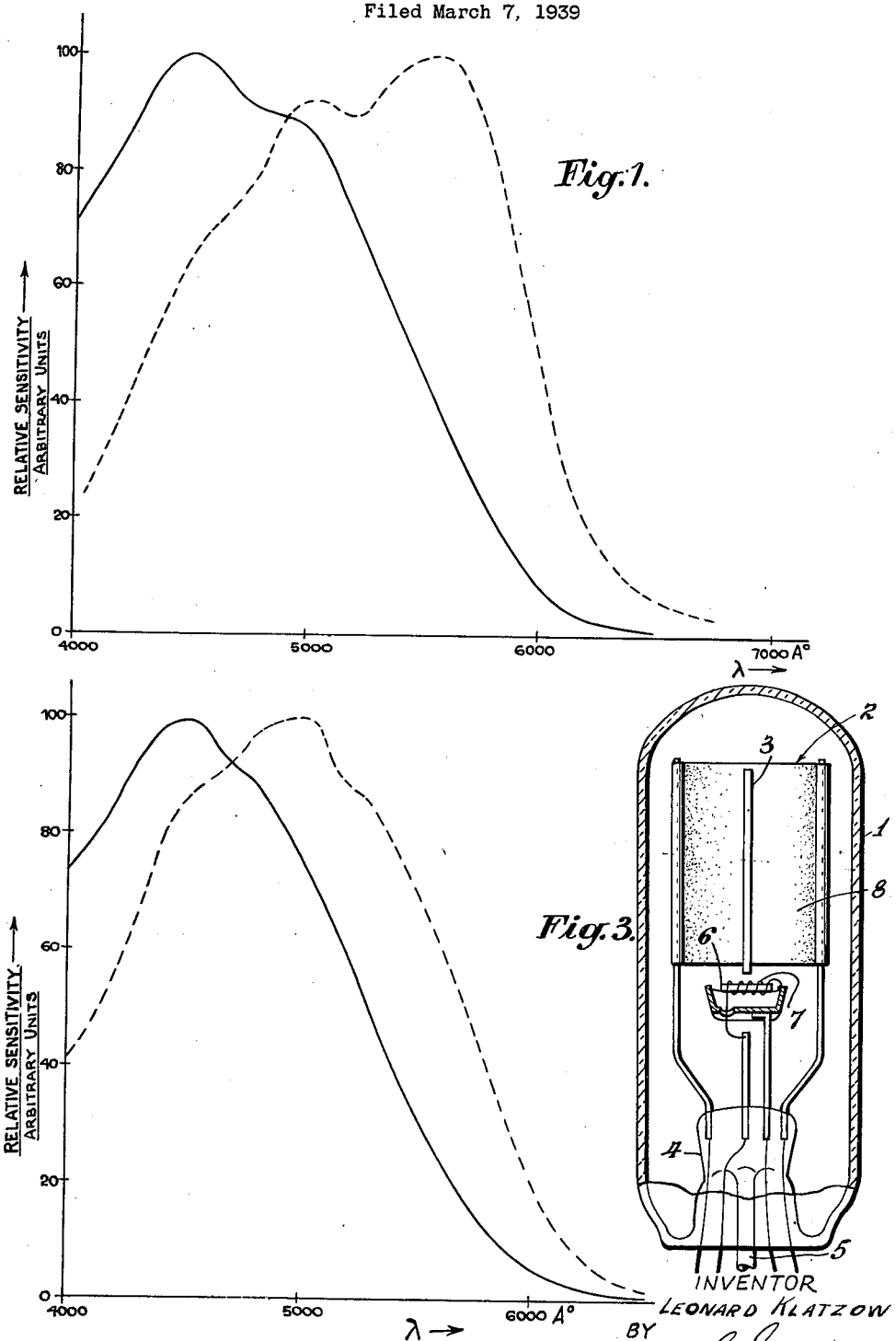

2,254,073

UNITED STATES PATENT OFFICE 2,254,073

PHOTOELECTRICALLY SENSITIVE SURFACE

Leonard Klatzow, London, England, assignor to Electric & Musical Industries Limited, Hayes, Middlesex, England, a company of Great Britain Application March 7, 1939, Serial No. 260,416
In Great Britain March 7, 1938

7 Claims. (Cl. 250—165)

This invention relates to photo-electrically sensitive surfaces such as are employed in photo-electric tubes in television transmitting apparatus and other devices.

It has been found with an antimony-caesium alloy when used as a photo-sensitive cathode in transparent photo-tubes that it is exceedingly difficult to obtain an adequate thinness of cathode so that it shall be transparent whilst at the same time maintaining the cathode conducting over its whole area. It is found that on baking the tube the cathode tends to crack with the result that areas having poor conductivity arise and, moreover, the cathode tends to peel away from the support onto which it is deposited such as the glass wall of an envelope or a separate support, such as a mica sheet. Cathodes formed from an antimony-caesium alloy tend to show poor saturation characteristics and in some cases show an undesirable photo-conductive effect.

In manufacturing television transmitting tubes it is desirable to bake the tube for various reasons prior to the deposition of the antimony or bismuth, but with the antimony or bismuth mounted on an evaporator or evaporators within the tube, at a temperature about 500° C. to 550° C., but since antimony vaporises considerably in vacuo at 450° C. and bismuth at a lower temperature, an amount of the antimony or bismuth tends to vaporise from the evaporators during the baking process.

It is the object of the present invention to provide an improved light-sensitive layer with a view to reducing or obviating these disadvantages.

It has been found that by compounding the antimony or bismuth with a conducting element and an element which raises the melting point of the compound so formed above that of pure antimony or reduces the vapour pressure below that of antimony at 450° C. in vacuo that these disadvantages are obviated or reduced.

According to the invention a light-sensitive layer is made by depositing the antimony or bismuth in the form of a compound of either of these elements, the compound being formed by the addition of another element which is electrically conductive and which is so proportioned as to raise the melting point of the compound so formed above that of antimony or to reduce the vapour pressure below that of antimony at 450° C. in vacuo, the compound of the antimony or bismuth being rendered light-senstive by the addition of caesium, rubidium or other suitable alkali metal. It has been found that best results are obtained by employing one of the compounds of antimony and palladium, the preferable compound being that designated by the formula $Sb_2Pd$. Other metals may be compounded with the antimony or bismuth, such as palladium, osmium, iridium, ruthenium, gold, silver, nickel, aluminium, copper, zinc, tellurium, chromium, iron and cobalt. In all cases the additional element (or in some cases a combination of additional elements) must be added to the antimony or bismuth in the proper proportion to form an inter-metallic chemical compound having a melting point above that of pure antimony or bismuth or reduce the vapour pressure below that of antimony at 450° C. in vacuo, the additional elements also being electrically conducting. Caesium is the preferable alkali metal to employ with the antimony or bismuth compound. By forming a photo-electric surface in this manner it is possible to produce a surface which is suitably conducting and is therefore eminently appropriate for use in transparent photo-tubes and, moreover, the response of the layer is substantially pan-chromatic with a high degree of sensitivity.

In manufacturing a photo-electrical surface according to the preferred form of the invention, an intimate mixture of powdered antimony and palladium black in weighed proportions corresponding with the formula $Sb_2Pd$ is heated either in air or in vacuo until a reaction commences. During the reaction heat and light are evolved, the final product being a coherent mass occupying a smaller volume than that of the original mixture. This reaction indicates that a chemical compound is formed between the antimony and palladium. The mass is brittle, but not as brittle as antimony.

The mass is broken up and a small piece is attached to a tungsten evaporating filament or filaments mounted in the conventional way within the envelope of the transmitting tube. After the usual process of baking at 500° C. to 550° C. and pumping the tube in order to remove deleterious gases the filament is heated to such a temperature that the antimony-palladium compound is evaporated and deposited in a thin film on the surface on which the photo-electric cathode is to be formed. This evaporation is stopped when the film is of the requisite thickness and caesium is distilled into the envelope from a side tube by heating until the desired photo-sensitivity is attained. Thereafter the envelope (and its contents) is baked for some minutes at a temperature round about 170° C. When the envelope is cool oxygen is slowly admitted. Part reacts with the photo-sensitive layer to increase its sensitivity and with other caesium within the envelope. The remainder not thus trapped is pumped out with the envelope baked again at a temperature of about 170° C. The envelope is finally sealed off the pumps.

In the accompanying drawing:

Figure 1 illustrates curves of an antimony-caesium tube in which the sensitivity is plotted in arbitrary units as ordinates and abscissae in Å. units, and Figure 2 illustrates similar curves taken from an antimony-palladium-caesium tube prepared in accordance with the present invention, and Figure 3 shows a photo-electric tube made in accordance with my invention. The full line curve shown in Figure 1 indicates the response of the tube when light is incident on the front of the tube, that is to say, directly onto the photo-electric surface, whilst the dotted line curve shows the response when the light is incident onto the rear of the surface, i. e., through its transparent support. Figure 2 also indicates full and dotted line curves, the full line curve being the one in which light is incident on the front of the tube and the dotted line curve one in which light is incident on the rear of the tube and it will be observed that in Figure 2 the peak of the curve is shifted from 5500 Å. units to 5000 units.

Figure 3 illustrates a tube made in accordance wth my invention wherein the envelope 1 encloses a photocathode foundation 2 and anode 3 supported by a press or stem 4. The stem 4 is provided with a tubulation 5 through which the envelope 1 is exhausted. The cathode 2 may be either of the opaque or semi-transparent type, and in accordance with my invention, is coated with a layer of metal compound such as from a mass 6 of antimony palladium compound supported within an evaporator 7 to form upon evaporation a layer 8 on the cathode foundation 2.

Although it is preferred to employ the compound of antimony and palladium having the formula $Sb_2Pd$ it is known that antimony forms three other compounds with palladium, namely, those designated by the formulae $PdSb$, $Pd_5Sb_3$ and $Pd_3Sb$. Each of these compounds reacts with caesium to varying degrees and any one or more of the compounds of antimony and palladium may be employed in conjunction with caesium or other alkali metal to form a photo-sensitive surface in accordance with the invention. The physical properties of the compounds of antimony and palladium (antimonides of palladium) are substantially different from those of antimony and in particular the melting point of each of the compounds is higher than that of antimony and, consequently, the tube in which the surface is mounted may be baked at a higher temperature to release deleterious gases compared with the baking temperature of a tube containing a layer formed of antimony and caesium. The colour response of a photo-sensitive layer formed in accordance with the invention, whilst being substantially pan-chromatic shows, however, more sensitivity at the blue end of the spectrum.

Although the invention is especially applicable for use with transparent photo-electric tubes or surfaces it will be understood that tubes can also be constructed which are substantially opaque. Further, although it is preferred as stated above, to employ a compound of antimony and palladium it is possible to employ other compounds of antimony and other compounds of bismuth.

I claim:

1. A photo-electric tube comprising an evacuated envelope, an anode within said envelope, a transparent light sensitive cathode, said cathode including a layer of chemically compounded antimony and palladium and a coating including caesium on said layer.

2. A photo-electric tube comprising an evacuated envelope, an anode within said envelope, a mass of metal compound including antimony as an element thereof mounted in said envelope, said compound having a vapor pressure less than the vapor pressure of antimony at 450° C. in vacuum, a photocathode including a layer of metal composed of the metal compound of said mass of metal and a coating on said layer including caesium.

3. A photo-emissive electrode including a chemical compound of antimony and palladium and a coating of an alkali metal.

4. An electron discharge device comprising an evacuated envelope, an anode within said envelope, a transparent light sensitive cathode, said cathode including a layer of chemically compounded antimony and palladium, said layer including alkali metal as an element thereof.

5. A photo-electric tube comprising an evacuated envelope, an anode within said envelope, a mass of metal compound of an electrically conducting metal and a metal selected from the group of metals consisting of antimony and bismuth within said envelope, said compound having a vapor pressure less than that of antimony at 450° C. in vacuum and a melting point greater than that of antimony, a cathode comprising a layer consisting predominately of metals deposited from the vapor of a portion of said mass of metal compound, said layer including an alkali metal in addition to the metals of said mass.

6. A photo-electric tube comprising an evacuated envelope, an anode within said envelope, a cathode adjacent said anode having a photosensitive layer comprising a chemical compound of a metal selected from the group of metals consisting of antimony and bismuth with a metal selected from the group of metals consisting of iron, nickel and cobalt and an alkali metal on said layer.

7. A photo-emissive cathode including a chemical compound of antimony and nickel as elements of said compound with caesium on said compound.

LEONARD KLATZOW.